United States Patent [19]

Webb

[11] 3,784,384

[45] Jan. 8, 1974

[54] HIGH TEMPERATURE CERAMIC COMPOSITION FOR HYDROGEN RETENTION

[75] Inventor: Ronald W. Webb, Canoga Park, Calif.

[73] Assignee: The United States of America as represented by the United States Atomic Energy Commission, Washington, D.C.

[22] Filed: Mar. 17, 1964

[21] Appl. No.: 353,024

[52] U.S. Cl. .................. 106/39, 176/82, 176/91 R, 106/52, 117/135.1

[51] Int. Cl. .................. C03c 3/04

[58] Field of Search .................. 117/135.1; 106/52, 106/69, 39; 176/72, 82, 91

[56] References Cited

UNITED STATES PATENTS

| | | | |
|---|---|---|---|
| 3,132,033 | 5/1964 | Tiede | 106/52 |
| 3,148,073 | 9/1964 | Smith et al. | 106/52 |
| 2,854,353 | 9/1958 | Schwope | 117/135.1 X |
| 3,133,829 | 5/1964 | Cuperg et al. | 117/127 |

*Primary Examiner*—Harvey E. Behrend
*Attorney*—L. Lee Humphries

EXEMPLARY CLAIM

1. A ceramic coating composition consisting essentially of about, by mole percent:

$SiO_2$ — 60–70
$Na_2O$— 1–4
$Li_2O$ — 1–6
CaO — up to 6
$TiO_2$ — 6–14
MgO— up to 3
BaO— 10–20
SrO— up to 2
$ZrO_2$ — 3–5
$MnO_2$— up to 3.

4 Claims, No Drawings

HIGH TEMPERATURE CERAMIC COMPOSITION FOR HYDROGEN RETENTION

The present invention relates to a ceramic coating for use in a nuclear reactor, and more particularly to a high temperature ceramic coating for hydrogen retention in a nuclear reactor fuel element.

Metal hydride compositions, such as titanium and zicronium hydride, are employed as moderating materials in nuclear reactors. Hydrogen has the greatest neutron slowing down power of any element, and combined with metals such as zirconium which have relatively low neutron absorption cross sections and reasonable structural properties, it is in a relatively stable, high density form. Homogeneous uranium-zirconium hydride fuel compositions are of particular interest where small reactor cores of high power density are required, for example, for remote terrestrial bases, mobile applications, and as auxiliary power sources in space vehicles. Reactor systems for such applications have been developed and for information concerning their characteristics reference is made to *Nucleonics*, January, 1960, and to the copending application of the common assignee, Ser. No. 26,904, filed May 4, 1960 in the names of Joseph R. Wetch et al. for "Compact Power Reactor."

Hydrogen does not combine with zirconium or titanium in a fixed stoichiometry; the hydrogen is interstitially absorbed in the metal matrix in variable amounts. The moderating properties of the composition are dependent upon the hydrogen concentration, and it follows that the reactor core size is directly proportional to the hydrogen concentration. Since size and weight are at a premium, particularly in space power plants, it is necessary to increase power density to reduce the size of a reactor core. This has stimulated the development of methods of increasing the hydrogen concentration of metal hydride fuel compositions. One such method is disclosed in the copending application of the common assignee, Ser. No. 113,036, filed May 26, 1961 in the name of Norman H. Katz for "Process for Massively Hydriding Zirconium-Uranium Fuel Elements."

However, the presence of high hydrogen concentrations in fuel elements operating at high temperatures, generally with liquid metal coolants, has created the problem of retaining the loosely associated hydrogen in the metal hydride composition. Hydrogen diffuses out of metal hydrides at elevated temperatures, and such will affect the operating characteristics of a reactor to the point of reducing its operating life. Therefore, it is particularly necessary to maintain the hydrogen in the fuel element, and to diminish hydrogen diffusion to an acceptable minimum, especially where long periods of unattended operation are required, as in space vehicles. A hydrogen loss rate of no greater than 5 percent per year is required for such applications.

Ceramic coatings have been proposed for use in uranium-zirconium hydride fuel elements to prevent hydrogen diffusion. There are a number of stringent requirements which a ceramic coating must meet for such applications. The composition should not contain materials with high thermal neutron absorption cross sections, which excludes certain otherwise satisfactory metal oxides widely used in ceramic coatings such as boron oxide and cadmium oxide. Materials that will react with hydrogen at elevated temperatures (1,200°–1,500°F.) also cannot be used. Oxides readily reduced by hot hydrogen produce reaction products of water and volatile metals, and degenerate the coating by forming large gas bubbles. Alkali metal oxides such as $K_2O$ and $Na_2O$, and also ZnO, tend to display such properties and cannot be used in large concentrations. The ceramic coating additionally must satisfactorily adhere to the metallic cladding of the fuel element. (The coating is generally more satisfactorily applied to the inside of the fuel cladding rather than on the fuel composition.) The cladding metals customarily used are stainless steel or nickel-base alloys of the Hastelloy series. Adherence may be considered for this purpose as a union of a metallic oxide, formed at the metal-ceramic interface, and a ceramic which is saturated with the same oxide; this requires resistance to reduction by the cladding metal and general similarity in thermal expansion characteristics. Further, the coating must have good thermal shock resistance and withstand repeated thermal cycles in the 1,000°–1,700° F. range.

Of fundamental importance is low porosity to hydrogen diffusion. As a measure of the hydrogen diffusion problem, it is noted that at 1,400°–1,500° F. the dissociation pressure of hydrogen in a metal hydride composition containing $6.0 \times 10^{22}$ atoms hydrogen per cc. is approximately 3 atmospheres. Hydrogen permeates metals monatomically and ceramics diatomically. Hydrogen diffusion through a metal, as an ion, is dependent upon the square root of the pressure. For a glass, no dissociation of the gas occurs on the surface and the rate of molecular hydrogen permeation varies directly as the pressure.

An object of the present invention, therefore, is to provide an improved ceramic coating to prevent hydrogen diffusion from a metal hydride composition.

Another object is to provide a ceramic coating with components of relatively low thermal neutron absorption cross section which will diminish hydrogen diffusion from a metal hydride nuclear reactor fuel composition at elevated temperatures.

Another object is to provide such a ceramic coating composition which is not readily reducible in a hydrogen atmosphere at temperatures of 1,500° F.

Still another object is to provide such a ceramic coating which will hold hydrogen diffusion to a rate no greater than about $2 \times 10^{-3}$ cc.(STP)/Hr.-cm.$^2$ at 1,500° F. and 1 atmosphere hydrogen pressure.

A further object is to provide such a ceramic coating which is adherent to a base metal and has high resistance to thermal shock, thermal cycling, and mechanical vibration.

Yet another object of the present invention is to provide an improved ceramic coating composition with a high firing temperature such that it would be very stable in normal reactor operating temperatures.

A still further object of the present invention is to provide a method of forming a ceramic hydrogen diffusion barrier for a metal hydride nuclear reactor fuel element.

These and other objects and advantages of the present invention will become apparent from the following detailed description.

In accordance with the present invention I have provided an improved ceramic composition for use as a hydrogen diffusion barrier. The general formulation of the improved ceramic composition and the apparent properties of each component are given in Table I below.

TABLE I

| Material | Range (Mole %) | Properties |
|---|---|---|
| $SiO_2$ | 60–70 | Glass former, low expansion |
| $Na_2O$ | 1–4 | Flux, low expansion |
| $Li_2O$ | 1–6 | Flux, low expansion |
| CaO | 0–6 | High temperature flux, network modifier |
| $TiO_2$ | 6–14 | Opacifier, crystal former |
| MgO | 0–3 | High temperature flux, network modifier |
| BaO | 10–20 | Increase density, high expansion, network modifier |
| SrO | 0–2 | Increase fluidity during firing |
| $ZrO_2$ | 3–5 | Opacifier, network modifier |
| $MnO_2$ | 0–3 | Oxidizing agent |

This composition is prepared, applied, and fired into a vitreous coating using conventional procedures. The formulation is melted and water-quenched to form an enamel frit. The frit is then milled to a fine particle size, a suspension formed, and the resulting slip applied on the base composition. Firing is conducted in an oxidizing atmosphere to obtain the vitreous coating. The resulting coating is stable and adherent at high temperatures in a hydrogen atmosphere, and is resistant to mechanical shock and temperature variations. Hydrogen diffusion is held to an acceptable minimum well within specifications.

It is observed that the present coating composition does not have components of high thermal neutron absorption cross sections, such as boron, or large amounts of easily reducible oxides. These reducible oxides which normally serve a fluxing function in ceramic coatings are largely replaced by the $Li_2O$ which is thermodynamically stable and has excellent fluxing properties. The barium oxide is also useful as a high temperature flux as an aid in raising the coefficient of thermal expansion of the glass.

A satisfactory ceramic coating composition range within the scope of the present invention is given in column one of Table II; a particularly suitable specific composition is shown in column two; and the single preferred embodiment in column three (by mole percent).

TABLE II

| Material | Column 1 | Column 2 | Column 3 |
|---|---|---|---|
| $SiO_2$ | 62–68 | 65.6 | 61.0 |
| $Na_2O$ | 1–3.5 | 3.5 | |
| $Li_2O$ | 2–5.0 | 2.5 | 5.9 |
| CaO | 2–5.0 | 2.0 | 2.1 |
| $TiO_2$ | 9–10 | 9.5 | 9.6 |
| MgO | 0–3.0 | 0.5 | 0.6 |
| BaO | 10–16 | 12.0 | 16.0 |
| SrO | 0.5–1.0 | 0.8 | 0.8 |
| $ZrO_2$ | 3–5.0 | 3.6 | 3.0 |
| $MnO_2$ | 0–3.0 | 0 | 1.0 |

The coating composition is prepared in the following manner using methods generally known to the art. Technical grade raw materials, initially in the oxide, nitrate, or carbonate forms, are weighed and blended together. These materials are in the form of fine powders, for example about 200-mesh. The mixture is then smelted until a uniform glass is formed. The smelting is carried out at a temperature of about 2,500°–2,600° F. Smelting is considered complete when a fine thread of glass is clear, glossy, and ductile, which generally requires about 2 hours. The molten glass is then quenched in order to facilitate later grinding. Quenching may be accomplished by pouring a small stream of molten glass into a well agitated water bath, passing the molten glass through water-cooled rolls, vacuum quenching, or quenching on a water-cooled plate. The first method, the simple water quenching, has proven to be satisfactory and is preferred.

The resulting frit is then ball-milled to achieve a reduction of particle size. A conventional ball mill is used and the frit ground to pass through a fine sieve. A slip is formed during the milling by addition of an aqueous or organic solvent and its consistency maintained by conventional additives. For example, about 60 parts of water to 100 parts frit are added to the mill. Another mill addition may be a small amount of a floating agent, such as a clay, which serves to maintain the colloidal suspension. For example, 6 parts of a clay and ¼ part bentonite may be added to the foregoing slip. Small amounts of ions of soluble salts, such as potassium nitrate, tetrapotassium pyrophosphate, and chromic oxide, may also be incorporated to help maintain the consistency of the slip.

As mentioned above, it is preferred to put the ceramic coating composition on the inside of the metal jacket of the uranium-zirconium hydride fuel element. This is because the coating is placed in compression, which is the strongest form of a glass. Also, a coating placed on the metal hydride would be in tension and would easily spall off during thermal cycling or upon fuel swelling. Stainless steels and Hastelloys (nickel-base alloys having Cr, Mo, and Fe additions) have been used as fuel cladding metals.

To improve adherence of the ceramic coating composition to the nickel-base alloys it is found that a preliminary surface treatment protects the alloy from oxidation and produces a more stable oxide bond with the coating. The molybdenum content of these alloys is volatile when oxidized, causing defects in a molten enamel. Surface coatings of chromium applied by conventional methods such as vapor deposition and pack cementation serve as an oxidation barrier for the molybdenum, allowing the successful application of the ceramic coating fired in an oxidizing atmosphere. It is also found useful to vacuum out-gas the fuel tubes and to degrease and sandblast the surface to improve adherence of the ceramic coating composition.

The coating slip may be applied to the fuel tube by such known methods as dipping and spraying. Flow coating is particularly useful to coat the inside of fuel element tubing. With a tube closed at one end with a welded end cap, coating is accomplished by filling the tube with the slip, and then inverting the tube to drain excess slip, leaving a thin film of coating on the walls thereof. The coatings are dried by placing the freshly coated tubes onto a vertical rack, open end down. Water is removed from the coating by warm air which is pulled through the tubes by a vacuum pump. The dried tubes are weighed for quality control, since the weight of dried enamel on a tube corresponds to the thickness of the coating. The coating step may be repeated depending upon the coating thickness required.

The resulting dried coated tube is then fired to fuse the finely divided particles into a smooth, glossy coating. For example, the firing may be conducted in air at a temperature of 1,800°–2,000° F. for 10–20 minutes, with conditions of about 1,950° F. for about 20 minutes being preferred.

The coated samples are given environmental testing which includes heating in hydrogen at 1,500° F. for various lengths of time up to 2,000 hours. Only a very slow rate of reaction with hydrogen is observed as shown by bubble growth in the coating. Hydrogen permeation testing is performed by introducing hydrogen gas to the inside of the coated tube to simulate the hydrogen pressure generated by a fuel material. Permeation membranes are inserted into a furnace held at an isothermal test temperature and a driving force applied by pulling a vacuum on the outside of the membrane. Any hydrogen permeating the glass coating is then passed through a mass spectrometer. Readings are monitored and calculations made of hydrogen permeation rates through the coating. Adherence testing is performed by opening short tube sections aged in hydrogen and bending the metal until the coating breaks off. Relative amounts of glass remaining on the bent section indicate the degree of adherence.

The following example is offered to illustrate the present invention in greater detail.

EXAMPLE

Weighed quantities of fine powders (200-mesh) of the following composition were mixed and blended to a uniform consistency:

$SiO_2$ — 61.00 Mole %
$Li_2O$ — 5.85 Mole %
CaO — 2.12 Mole %
$TiO_2$ — 9.63 Mole %
MgO — 0.61 Mole %
BaO — 16.00 Mole %
$SrO_2$ — 0.81 Mole %
$ZrO_2$ — 3.12 Mole %
MnO — 1.01 Mole %

The blended mixture was smelted at a temperature of about 2,550° F. in a gas-fired pot smelter to produce a molten clear glass. The molten glass was quenched by pouring a small stream of the glass into a water bath. The frit was next prepared into a slip by milling the frit charge in a ball mill. The mill charge had the following composition:

Frit — 100 parts
Natural clay — 6 parts
Bentonite — ¼ parts
Chromic Oxide — 2 parts
Potassium nitrite — ⅛ parts
Distilled water — 60 parts The mill charge was ground for 10 hours until a sample consisting of 50 cc. of slip passed through a 325-mesh sieve with less than 0.05 grams of glass remaining on the screen after drying. The specific gravity of the slip was 1.74 gm./cc. Additional small amounts of potassium nitrite were added to the slip to maintain proper consistency. This slip was applied onto a Hastelloy N tube which had been chromized and sandblasted to improve adherence, and had one end closed by means of a welded end cap. The tube was filled with the slip, and then inverted, allowing excess slip to flow out. The tube was dried by placing it on a vertical rack, open end down. A vacuum pump was used to remove water from the coating and to pass warm air through the tube. The dried tube was next placed in a furnace at 1,950° F. for 20 minutes to vitrify the coating. A clear, strongly adherent, ductile coating having strong resistance to thermal cycling and mechanical shock was obtained.

The average hydrogen permeation rate of a number of such samples was $1.0 \times 10^{-3}$ cc.(STP)/Hr.-$cm^2$ at 1 atmosphere pressure and 1,500° F. This is better than has heretofore been obtained with other glass coatings, and fully met requirements for unattended reactor operation of one year with less than 5 percent hydrogen loss. Further, the life expectancy of these samples is greater than 10,000 hours at 1,400° F. Five test samples have accrued more than 15,000 hours at temperatures of 1,300°–1,500° F. and at hydrogen pressures of 1–5 atmospheres.

The above example is illustrative rather than restrictive of the present invention. Various modifications of the composition and methods of application may be made by those skilled in the art without departing from the spirit of the invention, which should be understood to be limited, therefore, only as is indicated in the appended claims.

I claim:

1. A ceramic coating composition consisting essentially of about, by mole percent:

$SiO_2$ — 60–70
$Na_2O$ — 1–4
$Li_2O$ — 1–6
CaO — up to 6
$TiO_2$ — 6–14
MgO — up to 3
BaO — 10–20
SrO — up to 2
$ZrO_2$ — 3–5
$MnO_2$ — up to 3.

2. A ceramic coating composition consisting essentially of about, by mole percent:

$SiO_2$ — 62–68
$Na_2O$ — 1–3.5
$Li_2O$ — 2–5
CaO — 2–5
$TiO_2$ — 9–10
MgO — up to 3
BaO — 10–16
SrO — 0.5–1.0
$ZrO_2$ — 3–5
$MnO_2$ — up to 3.

3. A ceramic coating composition for hydrogen retention consisting essentially of about, by mole percent:

$SiO_2$ — 65.6
$Na_2O$ — 3.5
$Li_2O$ — 2.5
CaO — 2.0
$TiO_2$ — 9.5
MgO — 0.5
BaO — 12.0
SrO — 0.8
$ZrO_2$ — 3.6.

4. A ceramic coating composition for hydrogen retention consisting essentially of about, by mole percent:

$SiO_2$ — 61.0
$Li_2O$ — 5.9
CaO — 2.1
MgO — 0.6
$TiO_2$ — 9.6
BaO — 16.0
SrO — 0.8
$ZrO_2$ — 3.0
$MnO_2$ — 1.0.

* * * * *